United States Patent
Gieras et al.

(10) Patent No.: US 9,347,579 B2
(45) Date of Patent: May 24, 2016

(54) FLUX BYPASS FOR SOLENOID ACTUATOR

(71) Applicant: Hamilton Sundstrand Corporation, Windsor Locks, CT (US)

(72) Inventors: Jacek F. Gieras, Glastonbury, CT (US); Gary M. McBrien, S. Glastonbury, CT (US); Leo J. Veilleux, Jr., Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 97 days.

(21) Appl. No.: 14/169,793

(22) Filed: Jan. 31, 2014

(65) Prior Publication Data

US 2015/0097130 A1    Apr. 9, 2015

Related U.S. Application Data

(60) Provisional application No. 61/886,514, filed on Oct. 3, 2013.

(51) Int. Cl.
| | |
|---|---|
| *F16K 31/06* | (2006.01) |
| *H01F 7/08* | (2006.01) |
| *H01F 7/16* | (2006.01) |
| *H01F 7/13* | (2006.01) |

(52) U.S. Cl.
CPC ......... *F16K 31/0655* (2013.01); *F16K 31/0651* (2013.01); *H01F 7/081* (2013.01); *H01F 7/1607* (2013.01); *H01F 7/13* (2013.01); *H01F 2007/086* (2013.01)

(58) Field of Classification Search
CPC ..... F16K 31/02; F16K 31/06; F16K 31/0606; F16K 31/0651; F16K 27/029; F16K 31/0655; H01F 7/081; H01F 7/13; H01F 7/1607; H01F 2007/086
See application file for complete search history.

(56) References Cited

U.S. PATENT DOCUMENTS

| | | | | |
|---|---|---|---|---|
| 6,651,953 | B2 * | 11/2003 | Weldon | 251/129.02 |
| 7,458,531 | B2 * | 12/2008 | Mochizuki et al. | 239/585.5 |
| 7,874,541 | B2 * | 1/2011 | Abe et al. | 251/129.15 |
| 8,469,334 | B2 | 6/2013 | Yamagata et al. | |
| 8,973,894 | B2 * | 3/2015 | Ozaki et al. | 251/129.15 |
| 2007/0176720 | A1 | 8/2007 | Janssen et al. | |
| 2013/0181151 | A1 | 7/2013 | Iwata | |
| 2013/0248612 | A1 | 9/2013 | Ayanji et al. | |

FOREIGN PATENT DOCUMENTS

| | | |
|---|---|---|
| DE | 19841499 A1 | 3/2000 |
| EP | 0025382 A1 | 3/1981 |

(Continued)

OTHER PUBLICATIONS

Extended European Search Report from EP Application Serial No. 14180545.7, dated Feb. 11, 2015, 8 pages.

*Primary Examiner* — Matthew W Jellett
(74) *Attorney, Agent, or Firm* — Kinney & Lange, P.A.

(57) ABSTRACT

An electromagnetic solenoid actuator comprises a ferromagnetic core and a ferromagnetic plunger. The ferromagnetic core supports a plurality of windings, and is oriented along an axis. The ferromagnetic plunger is aligned axially with the ferromagnetic core, and is translatable along the axis to vary a width of an air gap separating the ferromagnetic plunger from the ferromagnetic core. The ferromagnetic plunger and the ferromagnetic core overlap axially at a flux bypass that provides an alternative flux path that diverts increasing flux away from the air gap as the width of air gap decreases.

14 Claims, 6 Drawing Sheets

(56) References Cited

FOREIGN PATENT DOCUMENTS

| EP | 1316750 | A1 | 6/2003 |
| EP | 1428236 | | 6/2004 |
| EP | 1848013 | A1 | 10/2007 |
| JP | S5424049 | U | 2/1979 |
| WO | 03001547 | A1 | 1/2003 |
| WO | WO2006/097452 | A1 | 9/2006 |
| WO | 2010006040 | A1 | 1/2010 |

* cited by examiner

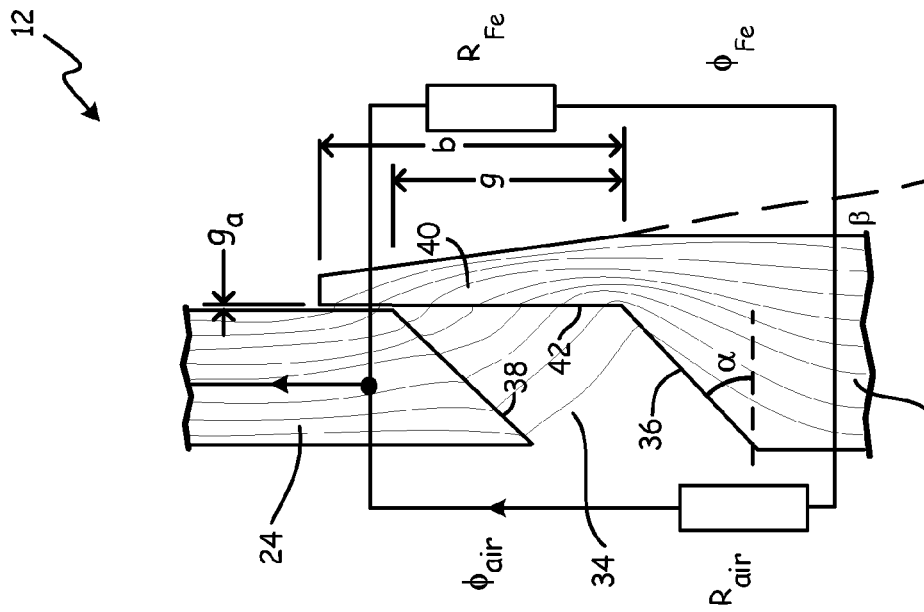
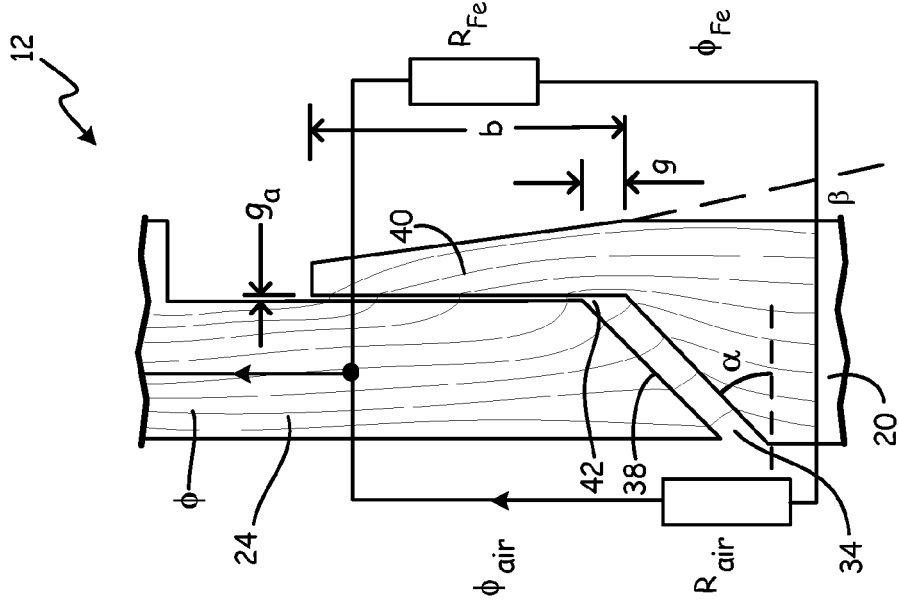
Fig. 2a
Fig. 2b

FLUX BYPASS FOR SOLENOID ACTUATOR

CROSS-REFERENCE TO RELATED APPLICATION

This application claims priority to U.S. provisional application Ser. No. 61/886,514, entitled "FLUX BYPASS FOR SOLENOID ACTUATOR," filed Oct. 3, 2013, which is hereby incorporated by reference in its entirety.

BACKGROUND

The present invention relates generally to solenoid actuators, and more specifically to a flux bypass for a solenoid actuator in a fluid valve system.

Solenoid actuators are short-stroke electromagnetic energy conversion devices that convert electrical energy into linear motion of a ferromagnetic plunger along a solenoid axis. Solenoid actuators are commonly used in a variety of applications, including as valve actuators for fluid systems. Solenoid actuators comprise helical coils wound about a ferromagnetic core separated from the ferromagnetic plunger by a variable air gap. The ferromagnetic plunger is typically biased away from the ferromagnetic core with a spring or similar element. A conventional solenoid actuator produces an electromagnetic attractive force between the ferromagnetic plunger and core that is inversely proportional to the square of the air gap width, i.e.:

$$F = \frac{1}{2}\frac{B_g}{\mu_0}S_g \quad \text{[Equation 1]}$$
$$= \frac{1}{2}\mu_0 \frac{(IN)^2}{\left(\frac{l_{Fe}}{\mu_r} + g\right)^2} S_g$$
$$\approx \frac{1}{2}\mu_0 \frac{(IN)^2}{g^2} S_g$$

where $B_g$ is the magnetic flux density in the air gap, $\mu_0 = 0.4\pi * 10^{-6}$ H/m is the magnetic permeability of free space, $\mu_r$ is the relative magnetic permeability of the ferromagnetic core, $S_g$ is the surface area of the air gap, g is the air gap width, $l_{Fe}$ is the mean path length for magnetic flux through the ferromagnetic material, I is the coil current, and N is the number of turns of the coil. Some solenoid actuators use conical air gaps for an increase in attractive force by increasing air gap surface area $S_g$.

The inverse proportionality of the attractive force between the ferromagnetic plunger and core to the square of the air gap width can pose a challenge to fine actuator control. In conventional solenoid actuators, attractive force F is dramatically greater at smaller gap widths than at greater gap widths. Some solenoid actuator systems attempt to hold attractive force constant as a function of air gap by appropriately modulating coil current I based on air gap width (i.e. with I(g) ∝g, such that $(IN)^2/g^2$ if substantially fixed).

SUMMARY

The present invention relates to an electromagnetic solenoid actuator comprising a ferromagnetic core and a ferromagnetic plunger. The ferromagnetic core supports a winding, and is oriented along an axis. The ferromagnetic plunger is aligned axially with the ferromagnetic core, and is translatable along the axis to vary a width of an air gap separating the ferromagnetic plunger from the ferromagnetic core. The ferromagnetic plunger and the ferromagnetic core overlap axially at a flux bypass that provides an alternative flux path that diverts increasing flux away from the air gap as the width of the air gap decreases.

BRIEF DESCRIPTION OF THE DRAWINGS

FIG. 2a is a schematic view of the electromagnetic solenoid actuator of FIG. 1 illustrating a flux bypass in a small air gap state of the electromagnetic solenoid actuator.

FIG. 2b is a schematic view of the electromagnetic solenoid actuator of FIG. 1 illustrating a flux bypass in a large air gap state of the electromagnetic solenoid actuator.

DETAILED DESCRIPTION

Figure 1:
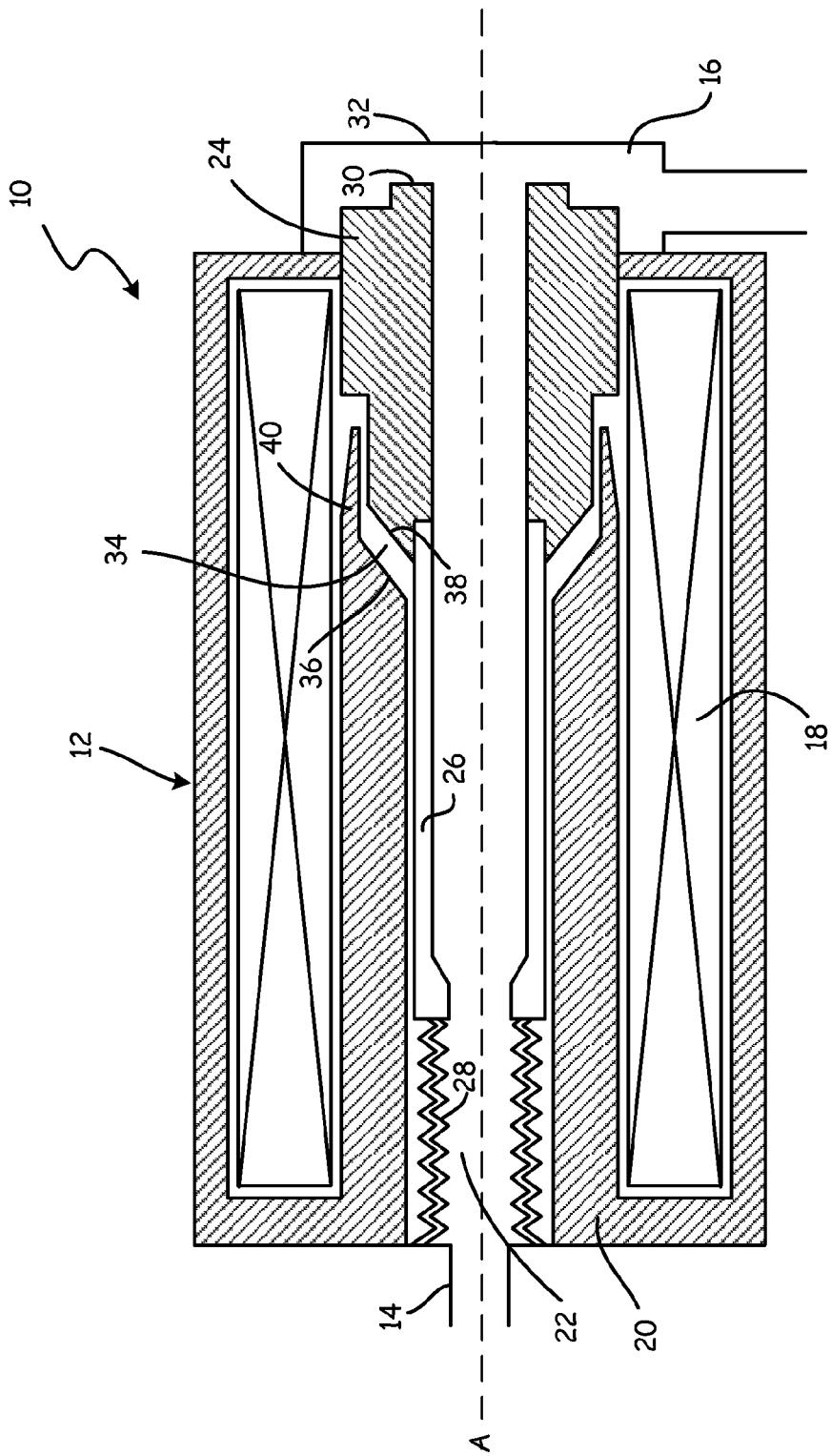
FIG. 1 is simplified cross-sectional view of a fluid valve actuated by an electromagnetic solenoid actuator.

FIG. 1 is a simplified cross-sectional view of fluid valve 10, comprising solenoid actuator 12, inlet 14, and outlet 16. Solenoid actuator 12 comprises field coils 18, ferromagnetic core 20, axial passage 22, ferromagnetic plunger 24, spacer sleeve 26, and spring bellows 28. As described below, inlet 14 carries fluid into fluid valve 10, outlet 16 carries fluid away from fluid valve 10, and solenoid actuator 12 governs (or halts) fluid flow from inlet 14 to outlet 16 based on an applied solenoid current through field coils 18. In alternative embodiments, however, fluid may flow through fluid valve 10 in the opposite direction (i.e. from outlet 16 towards inlet 14).

Field coils 18 are windings of conductive material formed on or wrapped about ferromagnetic core 12. Field coils 18 may, for instance, be copper windings wrapped about an inner diameter of ferromagnetic core 12, and enclosed by an outer diameter of ferromagnetic core 12. Ferromagnetic 20 core is a hollow, rigid conductive body that serves both as a flux guide for magnetic flux induced by current through field coils 18, and as a structural support for other components of solenoid actuator 12. In some alternative embodiments, solenoid actuator 12 may further comprise an external housing (not shown) enclosing and supporting ferromagnetic core 20. Ferromagnetic core 20 is substantially cylindrical, with axis A, as shown in FIG. 1. Ferromagnetic core 20 surrounds axial passage 22, a hollow opening that carries fluid from inlet 14 to outlet 16.

Ferromagnetic plunger 24 is a shuttle with seal face 30 opposite valve seat 32 of outlet 16. Seal face 30 and valve seat 32 cooperate to define the sole flow path from inlet 14 to outlet 16. Ferromagnetic plunger 24 translates axially along axis A, thereby restricting or halting fluid flow through solenoid actuator 12 by increasing or decreasing the valve opening defined between seal face 30 and valve seat 32. Like ferromagnetic core 20, ferromagnetic plunger 24 surrounds axial passage 22 and provides a flux path for flux induced by alternating current through field coils 18.

Spacer sleeve 26 and spring bellows 28 together exert a spring force on ferromagnetic plunger 24 that biases fluid valve 10 towards a closed state. Spring bellows 28 is an axially compressible tube that carries fluid from inlet 14 to spacer sleeve 26, and that applies an axial spring force on spacer sleeve when compressed. Spacer sleeve 26 carries fluid from spring bellows 28 to ferromagnetic plunger 24, and imparts spring force from spring bellows 28 on ferromagnetic plunger 24, thereby biasing ferromagnetic plunger 24 towards outlet 16 (to the right, as shown in FIG. 1), such that seal face 30 contacts valve seat 32 when field coils 18 are not energized. Spacer sleeve 26 and spring bellows 28 are both situated within axial passage 22.

Ferromagnetic core 20 and ferromagnetic plunger 24 are separated by air gap 34, which is defined by core surface 36 and plunger surface 38. In the depicted embodiment, air gap 34 is a conical air gap, as described in detail below with respect to FIGS. 2a and 2b. As ferromagnetic plunger 24 translates to the right along axis A, the distance between core surface 36 and plunger surface 38 increases, and air gap 34 widens. When field coils 18 are energized with current I, this current induces flux through ferromagnetic core 20, ferromagnetic plunger 38, and air gap 34, and creates a corresponding electromagnetic attractive force between ferromagnetic core 20 and ferromagnetic plunger 24 that opposes the spring force applied on ferromagnetic plunger 24 by spring bellows 28.

Solenoid actuator 12 includes flux bypass 40, a ferromagnetic section where ferromagnetic core 20 and ferromagnetic core 24 overlap axially to provide an alternative flux path that diverts some flux away from air gap 34. In the embodiment shown in FIG. 1, flux bypass 40 is a collar or annular flange extending axially from ferromagnetic core 20 to surround a portion of ferromagnetic plunger 24. Other embodiments of flux bypass 40 are described below with respect to FIGS. 4-8. Flux bypass 40 decreases the axial attractive force between ferromagnetic core 20 and ferromagnetic plunger 24 by providing an axial flux path between ferromagnetic core 20 and ferromagnetic plunger 24, such that the resulting magnetic attraction force between core surface 36 and plunger surface 38 is reduced. As gap width g of air gap 34 decreases, the proportion of magnetic flux passing through flux bypass 40 increases, and magnetic flux density within air gap 34 correspondingly decreases, causing a drop in attractive force. The inverse square dependency described in equation 1 of attractive force F on air gap width g is thus opposed by the countervailing tendency of flux bypass 40 to reduce air gap flux density as air gap g decreases. Within operational air gap widths g of solenoid actuator 12, attractive force F thus becomes nearly independent of air gap width g, as described in greater detail below with respect to FIG. 3.

FIGS. 2a and 2b are close-up schematic views of solenoid actuator 12 near air gap 34, and show ferromagnetic core 20 (with core surface 36), ferromagnetic plunger 38 (with plunger surface 38), air gap 34, and flux bypass 40, as described above. FIGS. 2a and 2b depict solenoid actuator 12 in "open" and "closed" states of fluid valve 10, respectively, and represent the extremes of the axial translation range of ferromagnetic plunger 24. Flux bypass 40 has bypass land 42, an axially-aligned surface parallel to the outer surface of ferromagnetic plunger 24. FIGS. 2a and 2b further illustrate gap width g of air gap 34, adjacent gap width $g_a$ between bypass land 42 and ferromagnetic plunger 24, bypass width b of flux bypass 40, air gap angle α of air gap 34, conical angle β of flux bypass 40, air gap flux $\Phi_{air}$, bypass flux $\Phi_{Fe}$, air reluctance $R_{air}$, bypass reluctance $R_{Fe}$, and total flux Φ. FIGS. 2a and 2b and are not to scale, and utilize flux lines illustrating flux density and flux paths within ferromagnetic core 20, ferromagnetic plunger 24, and air gap 34., as well as representing reluctances associated with the respective flux paths.

Gap width g is the axial distance separating core surface 36 from plunger surface 38 and defining air gap 34. Gap angle α characterizes the slope of air gap 34, which is depicted as a conical air gap to provide increased gap surface area. In alternative embodiments, however, gap angle α may be zero, indicating a flat/non-conical air gap 34. Flux bypass 40 extends past air gap 34, and radially surrounds ferromagnetic plunger 24 in the region near air gap 34.

Total flux Φ is conserved such that air gap flux $\Phi_{air}$+bypass flux $\Phi_{Fe}$=total flux Φ, which is constant for a given current I through field coils 18. Electromagnetic attractive forces from bypass flux $\Phi_{Fe}$ have no axial component, and radial force components cancel because of the cylindrical symmetry of solenoid actuator 12. Accordingly, bypass flux $\Phi_{Fe}$ does not contribute to attractive force F between ferromagnetic core 20 and ferromagnetic plunger 24, which is a net force along axis A. Extrapolating from equation 1, the attractive force between ferromagnetic core 20 and ferromagnetic plunger 24 can thus be expressed as:

$$F = \frac{1}{2}\frac{B_g}{\mu_0}S_g = \frac{1}{2}\frac{\Phi_{air}}{\mu_0} \qquad \text{[Equation 2]}$$

where $\Phi_{air}=B_g S_g=\Phi-\Phi_{air}$. Air gap flux $\Phi_{air}$ is controlled by selecting bypass reluctance $R_{Fe}$, since:

$$\Phi_{air} = \Phi_{Fe}\frac{R_{Fe}}{R_{air}} \qquad \text{[Equation 3]}$$

and field gap reluctance $R_{Fe}$ is described by:

$$R_{Fe} = \frac{g}{\mu_0 \mu_r S_{Fe}} \qquad \text{[Equation 4]}$$

where $S_{Fe}$ is the cross-sectional area of flux bypass 40. Relative magnetic permeability $\mu_r$ is a nonlinear function of magnetic field intensity and magnetic flux in flux bypass 40. For small values of air gap width g, bypass flux $\Phi_{Fe}$ and magnetic field intensity H in flux bypass 40 are high, and relative magnetic permeability $\mu_r$ is high. For large air gaps, bypass flux $\Phi_{Fe}$ and magnetic field intensity H in flux bypass 40 are low, and relative magnetic permeability $\mu_r$ is low. In general, for small values of air gap width g:

$$B_{g1} = \frac{\Phi_{Fe} - \Phi}{S_g} \qquad \text{[Equation 5]}$$
$$= \left(\frac{\Phi}{S_g} - IN\frac{\mu_0 \mu_{r1}}{g_{min}}\frac{S_{Fe1}}{S_g}\right)$$

and $$B_{g2} = \frac{\Phi_{Fe} - \Phi}{S_g} \qquad \text{[Equation 6]}$$
$$= \left(\frac{\Phi}{S_g} - IN\frac{\mu_0 \mu_{r2}}{g_{max}}\frac{S_{Fe2}}{S_g}\right)$$

wherein $g_{max}$ and $g_{min}$ are maximum and minimum values of air gap width g, respectively. Since magnetic flux density $B_{g1}<B_{g2}$ at low air gap width $g_1$, flux bypass 40 dramatically reduces electromagnetic attractive force F. At larger air gap $g_2$, by contrast, the reduction in $B_{g2}$ due to flux bypass 40 is minimal. Flux bypass 40 thus provides a countervailing limitation to electromagnetic attractive force F that largely cancels dependency on air gap width g across a wide range of air gap widths g corresponding to normal ranges of operation for solenoid actuator 12.

Flux bypass 40 extends axially a bypass width b from ferromagnetic core 20. Bypass width b may, for instance, be at least twice a maximum value of air gap width g. In some embodiments, bypass width b may be at least three times a maximum value of air gap width g. Flux bypass has a conical shape with narrower cross-section further from core surface 36. Because bypass reluctance $R_{Fe}$ is inversely related to cross-sectional area $S_{Fe}$ of flux bypass 40, cross-sectional area $S_{Fe}$ can be varied along bypass width b to control bypass flux $\Phi_{Fe}$, and therefore attractive force F. For example, to hold electromagnetic attractive force F substantially constant as a function of air gap width g, flux bypass 40 may for instance be characterized by conical angle β between 10° and 20° to change cross-sectional area $S_{Fe}$ along the length of flux bypass 40. Although FIGS. 2a and 2b focus on an embodiment of flux bypass 40 extending from ferromagnetic core 20 to partially surround an air gap region of ferromagnetic plunger 24, other embodiments of flux bypass 40 are also possible, and are discussed in greater detail below with respect to FIGS. 4-8.

Figure 3:
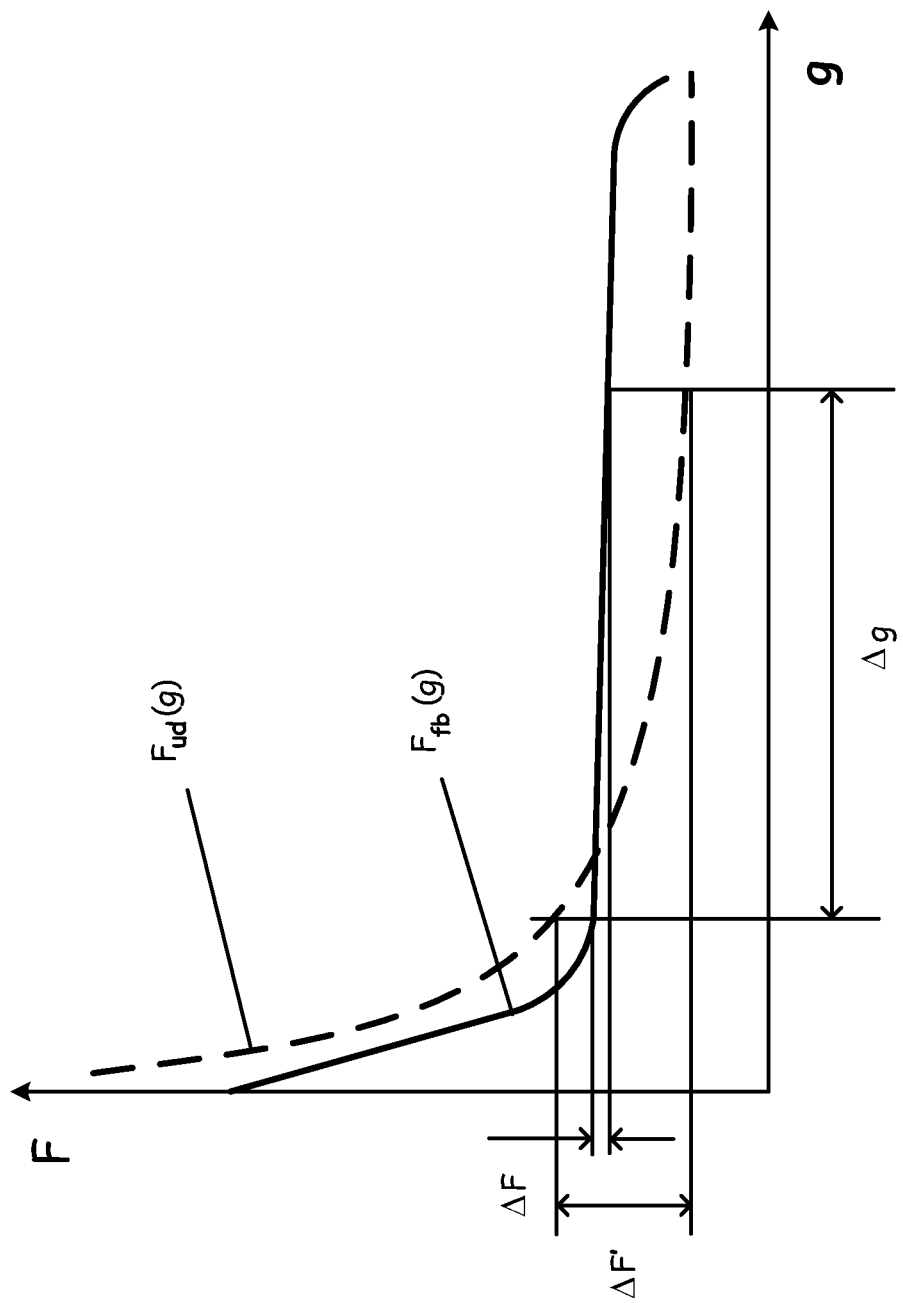
FIG. 3 is a graph of flux as a function of field gap width within the field gap of the electromagnetic solenoid actuator of FIG. 1.

FIG. 3 is a graph of electromagnetic attractive force F between ferromagnetic core 20 and ferromagnetic plunger 24 as a function or air gap width g. FIG. 3 illustrates conventional attractive force $F_{ud}(g)$ for an undiverted solenoid actuator as known in the prior art (dashed line), diverted attractive force $F_{fb}(g)$ with flux bypass 40 (solid line), air gap range Δg, conventional attractive force range ΔF', and diverted attractive force range ΔF. Air gap range Δg illustrates the range of possible air gap widths during operation of solenoid actuator 12 and fluid valve 10. ΔF' represents a range of variation in undiverted attractive force $F_{ud}(g)$ between ferromagnetic core 20 and ferromagnetic plunger 24 in the prior art. ΔF represents a range of variation in diverted attractive force $F_{fb}(g)$ between ferromagnetic core 20 and ferromagnetic plunger 24 using solenoid actuator 12 with flux bypass 40. ΔF is much less than ΔF', indicating that diverted attractive force $F_{fb}(g)$ varies relatively little across the full extent of air gap range Δg relative to undiverted attractive force $F_{ud}(g)$. In some embodiments, range of variation ΔF' may be at least a factor of 10 greater than ΔF (i.e. ΔF'>10*ΔF). In some embodiments, ΔF may vary by 5% or less across air gap range Δg. Within air gap range Δg, $F_{fb}(g)$ is substantially independent of air gap width g. This functional behavior allows solenoid actuator 12 and accordingly fluid valve 10 to be controlled in a metered fashion without need to compensate for air gap variations.

FIGS. 4-8 depict solenoid actuators 12b-12f with flux bypasses 40b-40f, respectively. Solenoid actuators 12b-12f are alternative embodiments to solenoid actuator 12 as depicted and described with respect to FIGS. 1, 2a, and 2b, and include field coils 18, ferromagnetic core 20, and ferromagnetic plunger 24. Other than differences in the geometry of flux bypasses 40b-40f, solenoid actuators 12b-12f behave substantially as described above.

Figure 4:
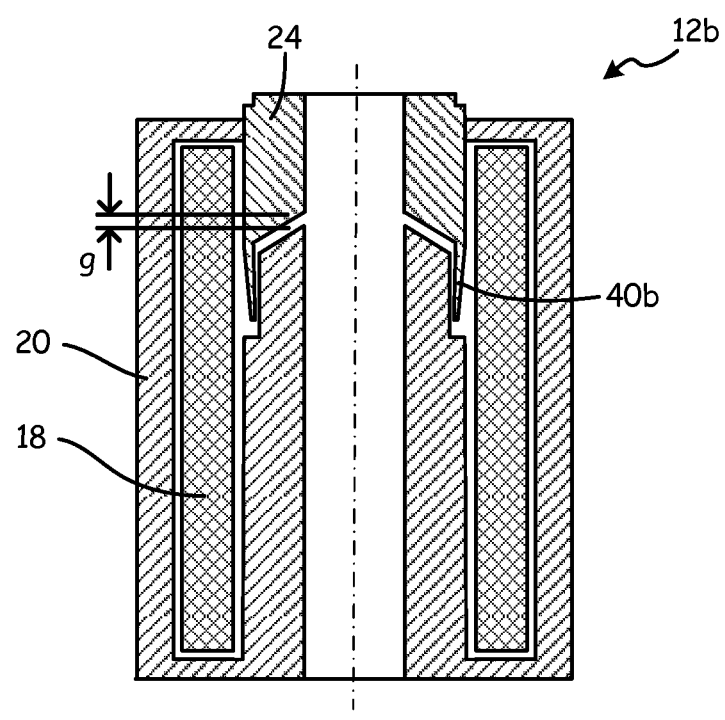
FIGS. 4-8 are cross-sectional views of alternative embodiments of the electromagnetic solenoid actuator of FIG. 1.
Figure 5:
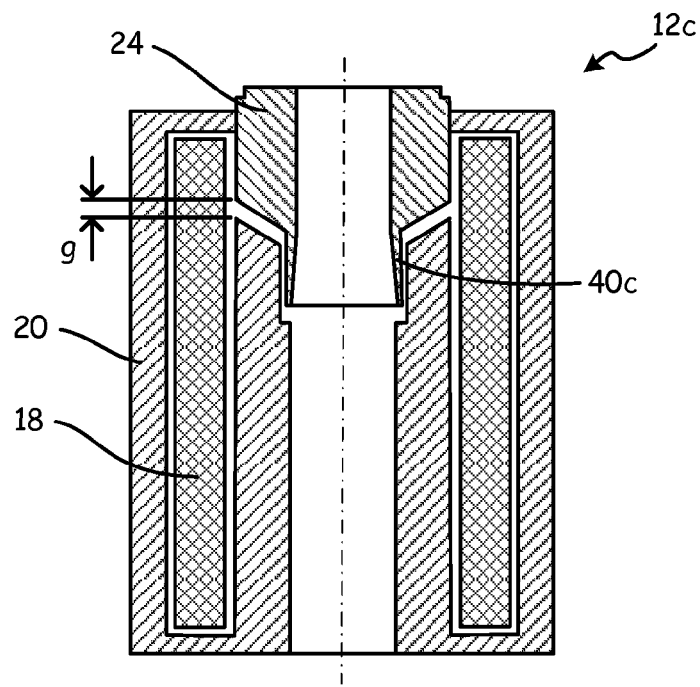
Figure 6:
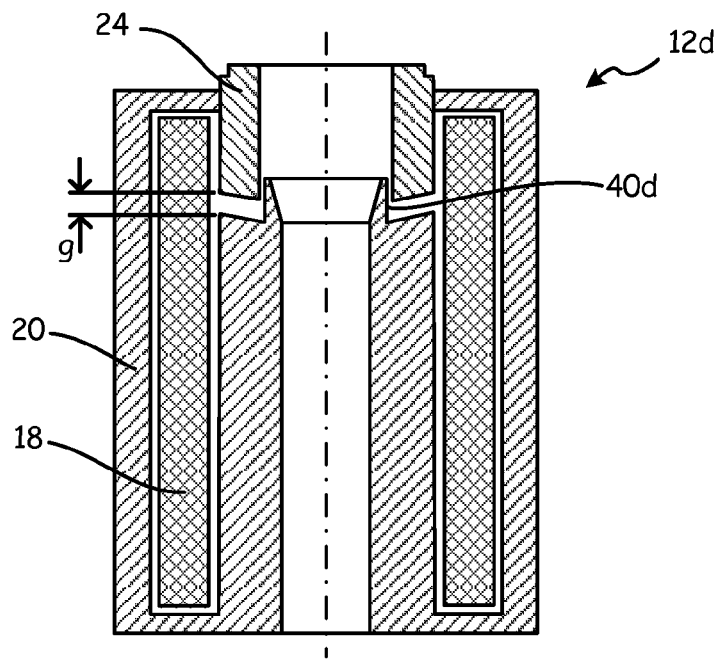
Figure 7:
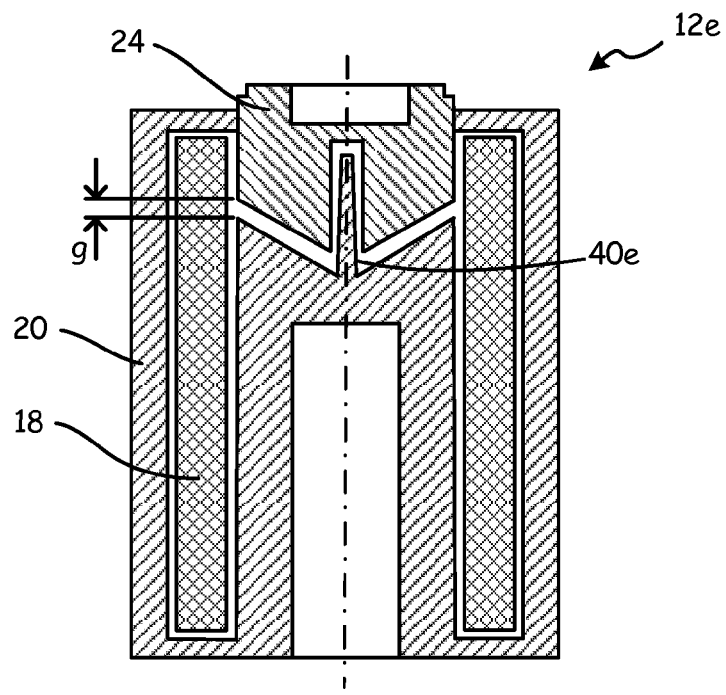
Figure 8:
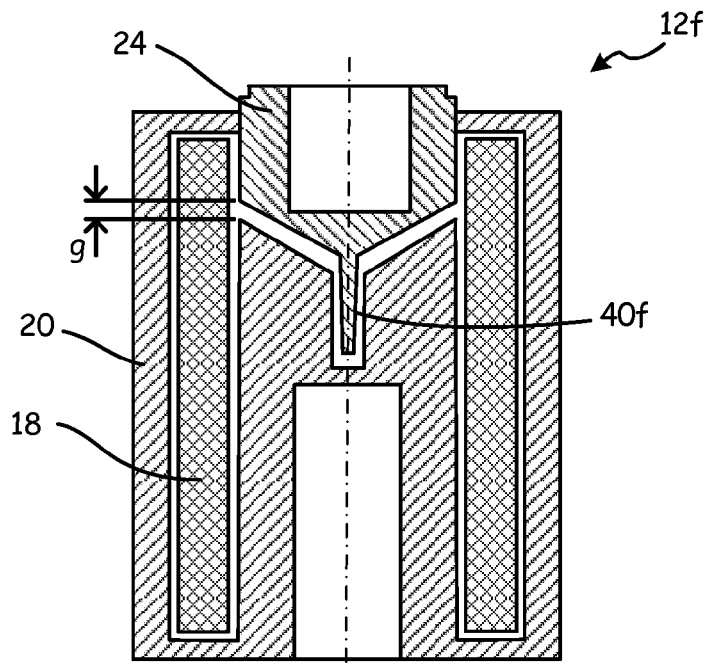

FIG. 4 depicts solenoid actuator 12b, wherein flux bypass 40b extends from ferromagnetic plunger 24 to surround a portion of ferromagnetic core 20 adjacent to air gap 34. FIG. 5 depicts solenoid actuator 12c, wherein flux bypass 40c is a collar or annular flange that extends from ferromagnetic plunger 24 axially alongside and radially inward of ferromagnetic core 20. FIG. 6 depicts solenoid actuator 12d, wherein flux bypass 40d is a collar or annular flange that extends from ferromagnetic core 20 axially alongside and radially inward of ferromagnetic plunger 24. FIG. 7 depicts solenoid actuator 12e, wherein flux bypass 40e is a central conical pin extending axially from ferromagnetic core 20 into a corresponding recess in ferromagnetic plunger 24. FIG. 8 depicts solenoid actuator 12f, wherein flux bypass 40f is a central conical pin extending axially from ferromagnetic plunger 24 into a corresponding recess in ferromagnetic core 20. FIGS. 7 and 8 depict embodiments wherein fluid flows not only through axial passage 22, but also through secondary channels (not shown) through ferromagnetic core 20 and ferromagnetic plunger 24 near air gap 34.

In all embodiments, flux bypass 40 (including flux bypasses 40b-40f) diverts flux away from air gap 34, this reducing the strength of electromagnetic attractive force F between ferromagnetic core 20 and ferromagnetic plunger 24 as air gap width g shrinks. This effect opposes the inverse square dependency of attractive force F on air gap width g, resulting in a net attractive force $F_{fb}(g)$ that is substantially independent of air gap width g across a wide range of operational air gap widths defined by air gap range Δg.

Discussion of Possible Embodiments

The following are non-exclusive descriptions of possible embodiments of the present invention.

An electromagnetic solenoid actuator comprising a ferromagnetic core supporting a winding and oriented along an axis; and a ferromagnetic plunger aligned axially with the ferromagnetic core, and translatable along the axis to vary a width of an air gap separating the ferromagnetic plunger from the ferromagnetic core; wherein the ferromagnetic plunger and the ferromagnetic core overlap axially at a flux bypass that provides an alternative flux path that diverts increasing flux away from the air gap as the width of the air gap decreases.

The electromagnetic solenoid actuator of the preceding paragraph can optionally include, additionally and/or alternatively, any one or more of the following features, configurations and/or additional components:

A further embodiment of the foregoing electromagnetic solenoid actuator, wherein the flux bypass has a frustoconical cross-section.

A further embodiment of the foregoing electromagnetic solenoid actuator, wherein the frustoconical cross-section of the flux bypass is characterized by a conic angle between 10° and 20° with respect to the axis.

A further embodiment of the foregoing electromagnetic solenoid actuator, wherein the flux bypass has a width at least twice a maximum width of the air gap.

A further embodiment of the foregoing electromagnetic solenoid actuator, wherein the flux bypass has a width at least three times the maximum width of the air gap.

A further embodiment of the foregoing electromagnetic solenoid actuator, wherein the flux bypass comprises a collar extending axially from one of the ferromagnetic core and the ferromagnetic plunger, to surround a region of the other of the ferromagnetic core and the ferromagnetic plunger near the air gap.

A further embodiment of the foregoing electromagnetic solenoid actuator, wherein the ferromagnetic plunger and the ferromagnetic core are axially hollow, and the flux bypass comprises a collar extending from an inner diameter of one of the ferromagnetic core and the ferromagnetic plunger, axially past the other of the ferromagnetic core and the ferromagnetic plunger.

A further embodiment of the foregoing electromagnetic solenoid actuator, wherein the flux bypass comprises a conical spike extending axially from a center of one of the ferromagnetic core and the ferromagnetic plunger, past the air gap to axially overlap the other of the ferromagnetic core and the ferromagnetic plunger.

A further embodiment of the foregoing electromagnetic solenoid actuator, wherein the air gap is angled at an acute angle relative to the axis.

A further embodiment of the foregoing electromagnetic solenoid actuator, wherein attractive force between the ferromagnetic core and the ferromagnetic plunger varies by 5% or less as a function of the width of the air gap, across all possible widths of the air gap.

A further embodiment of the foregoing electromagnetic solenoid actuator, wherein the flux bypass lowers variation in attractive force between the ferromagnetic core and the ferromagnetic plunger as a function of the width of the air gap by at least a factor of 10.

A fluid valve comprising: a hollow ferromagnetic solenoid actuator core supporting a winding and disposed about a fluid inlet disposed along an axis; a hollow ferromagnetic solenoid actuator plunger aligned axially with the hollow ferromagnetic solenoid actuator core, and translatable along the axis to vary a width of an air gap separating the ferromagnetic plunger from the ferromagnetic core; a bellows disposed to carry fluid from the fluid inlet to the hollow ferromagnetic actuator core, and to bias the hollow ferromagnetic solenoid actuator plunger against a valve seat in a seal; wherein the hollow ferromagnetic solenoid actuator plunger and the hollow ferromagnetic solenoid actuator core overlap axially at a flux bypass that provides an alternative flux path that diverts increasing flux away from the air gap as the width of the air gap decreases.

The fluid valve of the preceding paragraph can optionally include, additionally and/or alternatively, any one or more of the following features, configurations and/or additional components:

A further embodiment of the foregoing fluid valve, further comprising a non-ferromagnetic sleeve disposed between the bellows and the hollow ferromagnetic solenoid actuator plunger.

A further embodiment of the foregoing fluid valve, wherein the flux bypass has a width at least twice a maximum width of the air gap.

A further embodiment of the foregoing fluid valve, wherein the flux bypass land has a width at least three times the maximum width of the air gap.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electromagnetic solenoid actuator comprising:
    a ferromagnetic core supporting a winding and oriented along an axis; and
    a ferromagnetic plunger aligned axially with the ferromagnetic core, and translatable along the axis to vary a width of an air gap separating the ferromagnetic plunger from the ferromagnetic core, up to a maximum air gap width;
    wherein the ferromagnetic plunger and the ferromagnetic core overlap axially at a flux bypass that provides an alternative flux path that diverts increasing flux away from the air gap as the width of the air gap decreases, the flux bypass having an axial bypass width at least twice the maximum air gap width.

2. The electromagnetic solenoid actuator of claim 1, wherein the flux bypass has a frustoconical cross-section.

3. The electromagnetic solenoid actuator of claim 2, wherein the frustoconical cross-section of the flux bypass is acutely angled at between 10° and 20° with respect to the axis.

4. The electromagnetic solenoid actuator of claim 1, wherein the flux bypass has a width at least three times the maximum air gap width.

5. The electromagnetic solenoid actuator of claim 1, wherein the flux bypass comprises a collar extending axially from one of the ferromagnetic core and the ferromagnetic plunger, to surround a region of the other of the ferromagnetic core and the ferromagnetic plunger near the air gap.

6. The electromagnetic solenoid actuator of claim 1, wherein the ferromagnetic plunger and the ferromagnetic core are axially hollow, and the flux bypass comprises a collar extending from an inner diameter of one of the ferromagnetic core and the ferromagnetic plunger, axially past the other of the ferromagnetic core and the ferromagnetic plunger.

7. The electromagnetic solenoid actuator of claim 1, wherein the flux bypass comprises a conical spike extending axially from a center of one of the ferromagnetic core and the ferromagnetic plunger, past the air gap to axially overlap the other of the ferromagnetic core and the ferromagnetic plunger.

8. The electromagnetic solenoid actuator of claim 1, wherein the air gap is angled at an acute angle relative to the axis.

9. The electromagnetic solenoid actuator of claim 1, wherein attractive force between the ferromagnetic core and the ferromagnetic plunger varies by 5% or less as a function of the width of the air gap, across all possible widths of the air gap.

10. The electromagnetic solenoid actuator of claim 1, wherein the flux bypass lowers variation in attractive force between the ferromagnetic core and the ferromagnetic plunger as a function of the width of the air gap by at least a factor of 10.

11. A fluid valve comprising:
    a hollow ferromagnetic solenoid actuator core supporting a plurality of windings and disposed about a fluid inlet disposed along an axis;
    a hollow ferromagnetic solenoid actuator plunger aligned axially with the hollow ferromagnetic solenoid actuator core, and translatable along the axis to vary a width of an air gap separating the ferromagnetic plunger from the ferromagnetic core, up to a maximum air gap width;
    a bellows disposed to carry fluid from the fluid inlet to the hollow ferromagnetic actuator core, and to bias the hollow ferromagnetic solenoid actuator plunger against a valve seat in a seal;
    wherein the hollow ferromagnetic solenoid actuator plunger and the hollow ferromagnetic solenoid actuator core overlap axially at a flux bypass having an axial bypass width at least twice the maximum air gap width, such that the flux bypass provides an alternative flux path that diverts increasing flux away from the air gap as the width of the air gap decreases.

12. The fluid valve of claim 11, further comprising a non-ferromagnetic sleeve disposed between the bellows and the hollow ferromagnetic solenoid actuator plunger.

13. The fluid valve of claim 11, wherein the flux bypass has a width at least three times a maximum width of the air gap.

14. The fluid valve of claim 13, wherein the flux bypass land has a width at least three times the maximum width of the air gap.

* * * * *